Dec. 17, 1929.  A. W. ALTHOFF  1,740,385
JACKING AND TRAVERSING ATTACHMENT FOR MOTOR VEHICLES
Filed June 1, 1928  3 Sheets-Sheet 1
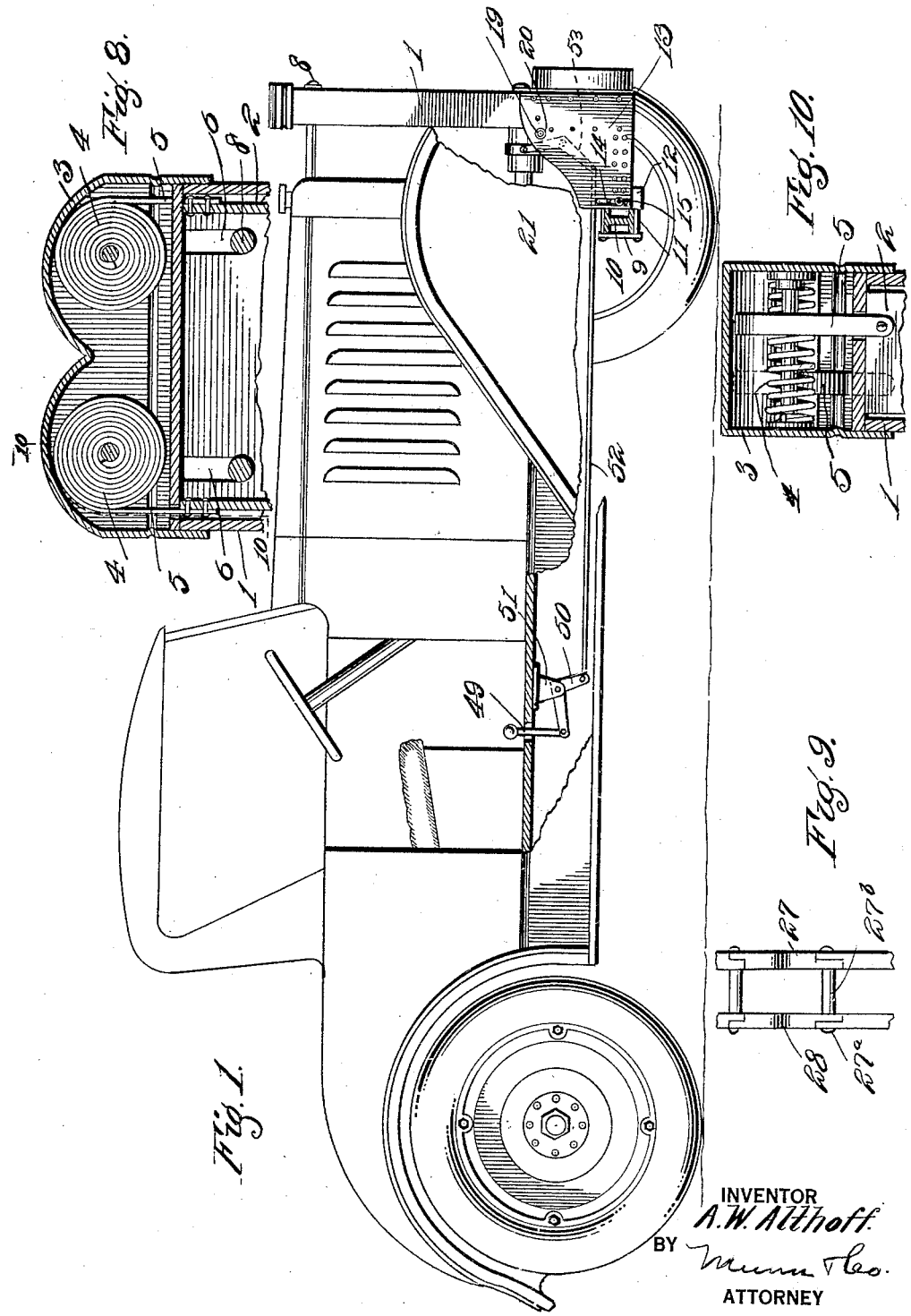
INVENTOR
A.W. Althoff
BY
ATTORNEY

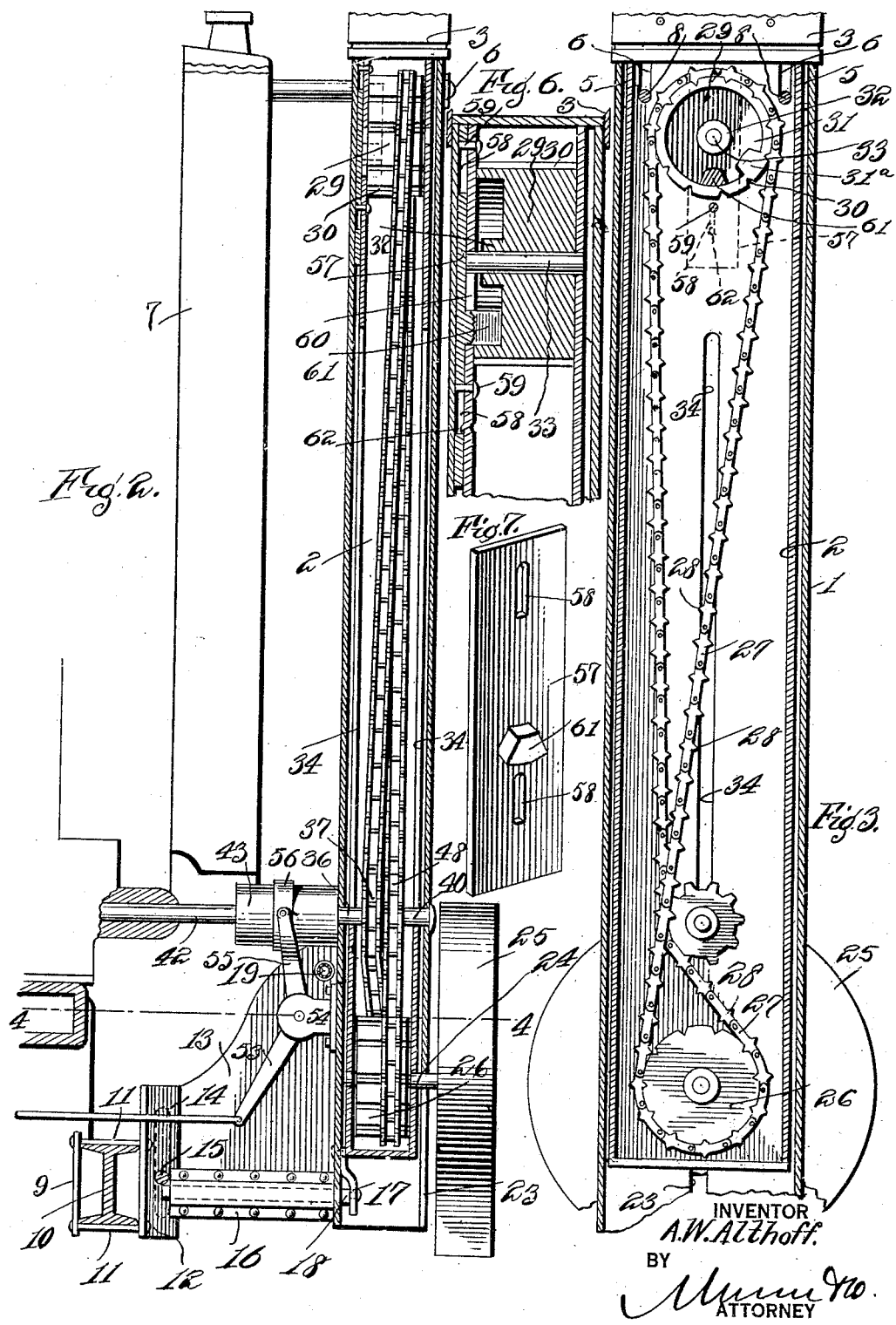

Dec. 17, 1929.  A. W. ALTHOFF  1,740,385
JACKING AND TRAVERSING ATTACHMENT FOR MOTOR VEHICLES
Filed June 1, 1928  3 Sheets-Sheet 3
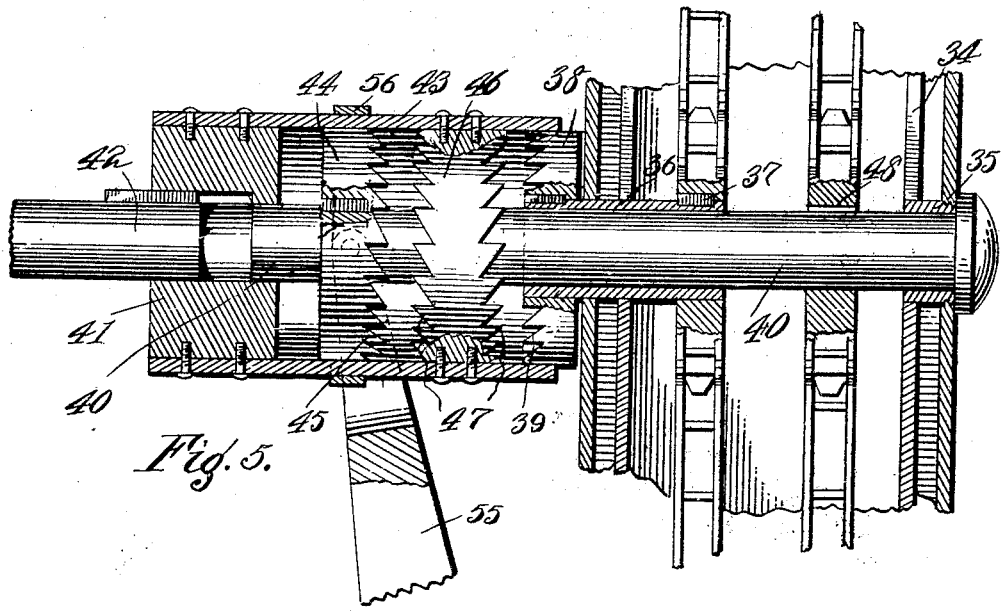
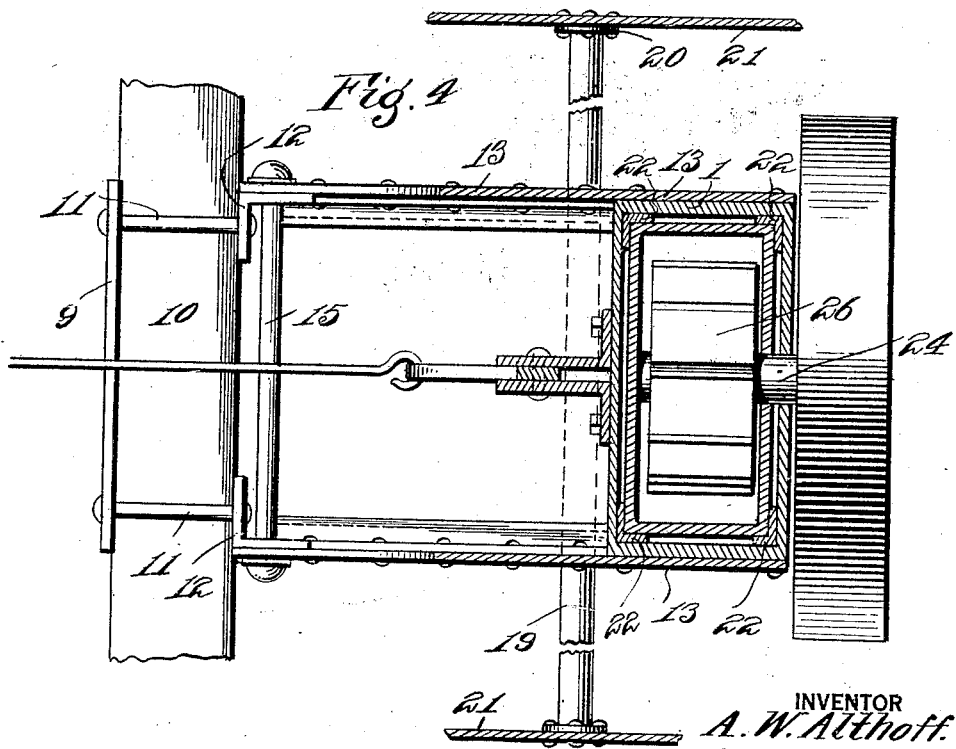
INVENTOR
A. W. Althoff.
BY
ATTORNEY Patented Dec. 17, 1929

1,740,385

UNITED STATES PATENT OFFICE

AUGUST W. ALTHOFF, OF TULSA, OKLAHOMA

JACKING AND TRAVERSING ATTACHMENT FOR MOTOR VEHICLES

Application filed June 1, 1928. Serial No. 282,248.

This invention relates to motor vehicles, and is more particularly concerned with a jacking and traversing attachment for the front ends thereof by means of which said end of the vehicle may be lifted and swung in to or lifted and swung out from a parking line, such as the curb line of a street, under its own power, thereby enabling the vehicle to be parked in a short parking space which would be otherwise inaccessible and extricated from such a space either when originally parked there or trapped therein after parking by subsequent movement of adjacent parked vehicles.

Congested traffic conditions in the larger cities have made the question of parking a serious problem. The use of the device of the present invention will increase the number of available parking spaces by decreasing the space now required between adjacent vehicles parked parallel to a parking or curb line; will provide means for turning a vehicle around in either direction in a narrow roadway where such an operation is impossible with the standard equipment of the motor vehicle; and incidently provides a convenient means for jacking up the front end of the vehicle under its own power for tire changes or work on the front construction requiring elevation of the front end.

The attachment of the present invention is adapted to standard constructions of motor vehicles without modification thereof, operating power being provided by a connection to the front or cranking end of the motor crank shaft.

A feature of the invention consists of a jacking and traversing mechanism for one end of motor vehicles comprising a casing mounted centrally of and extending vertically of the vehicle end and mounting a fifth wheel for rotation about an axis extending longitudinally of the vehicle, with mechanism powered by the motor of the vehicle and selectively operable at will to lower the casing to engage its fifth wheel with the ground to jack up the connected end of the vehicle and thereafter automatically to turn said wheel in a preselected direction to swing the elevated end of the vehicle transversely in the direction preselected.

Further related features consist in the constructions, combinations, and arrangements of parts providing the described mechanism.

Use of the described mechanism requires that it be supported, while in inoperative position, to permit relative movement of body and axle by spring flexure in the driving of the vehicle, and that it be rigidly supported by the body or chassis and axle during its jacking and traversing operation.

Accordingly, a further feature of the invention consists of an outer casing supported from the body of the vehicle and extending vertically thereof and mounting a power shaft clutch coupled to the crank shaft of the vehicle motor, an inner casing telescoping therein mounting a fifth wheel at its lower end having power transmitting connection with said power shaft effective to lower the inner casing to contact its fifth wheel with the ground and jack of the vehicle end and thereafter to rotate said wheel to swing the end of the vehicle transversely, with connections between said outer casing and the vehicle axle permitting movement of the axle relatively thereto through spring flexure with the inner casing in raised inoperative position, and means automatically movable to lock said outer casing to the vehicle axle through lowering movement of the inner casing and automatically moved to axle releasing position by the raising of said inner casing to inoperative position.

As a further feature of the invention, rotation of the fifth wheel in reverse directions is provided by two driving elements rotating in the same direction selectively coupled to the motor drive by selectively operated clutch mechanism and coupled to the fifth wheel for rotation thereof in reverse directions by a single wrapping connector effective to transmit movement thereto from said two driving elements in reverse directions.

These and other features of the invention will be more clearly apparent from the following detailed specification which is to be read in conjunction with the accompanying drawings forming part thereof and in which:—

Figure 1 is a view in side elevation, with parts of the body and fenders broken away of a motor vehicle having the attachment of the present invention applied to its front end.

Figure 2 is a vertical sectional view through the attachment as applied to the front end of the vehicle, with the radiator of the latter appearing in elevation to denote the physical relation of the attachment thereto.

Figure 3 is a transverse vertical section through the casing of the attachment shown in Figure 2.

Figure 4 is a horizontal section through the lower portion of the casing made on an enlarged scale and taken on the line 4—4 of Figure 2, the attachment of the casing to the front fenders being additionally shown.

Figure 5 is a fragmentary vertical section on an enlarged scale through the casing and selective clutch for the power driven shaft housed therein.

Figure 6 is a fragmentary transverse vertical section on an enlarged scale through the upper sprocket gear and its locking and releasing plate, taken on line 6—6 of Figure 3.

Figure 7 is a detail perspective view of the sliding gear locking and releasing plate.

Figure 8 is a detail sectional view of the ornamental cap for the upper end of the casings housing the spring reels elevating the inner casing.

Figure 9 is a fragmentary detail in top plan of the chain cooperating with the sprocket gearing.

Figure 10 is a fragmentary detail view of top of jack casing.

As previously stated, the device constituting the present invention is applicable to existing standard types of motor vehicles and as shown is adapted for application to the front end of a motor vehicle and is powered through its motor through a selectively operable clutch connection to the front end of its crank shaft to rotate one or the other of two power driven elements through which a fifth wheel mounted upon an axis extending longitudinally of the vehicle is operated, first to contact with the ground and jack up the front end of the vehicle and thereafter to automatically rotate in a preselected direction to swing the front end of the vehicle transversely in the direction selected.

The attachment, proper, is in the form of two telescoping tubular sections 1 and 2, the outer section being supported at its upper end from the radiator, at its lower end from the front fenders and having a sliding mount on the front axle and being provided with automatic latching means to lock it rigidly to the front axle when the fifth wheel is lowered and to release it from said axle when the fifth wheel is elevated to inoperative position so that in the movement of the vehicle over the ground when the attachment is in inoperative position thereon, the casings may move with the vehicle body and relatively to the vehicle axle to permit spring flexure and relative movement between the body and axle without injury to the device.

The outer tubular casing 1 extends from a point alining with the front axle to approximately the full height of the vehicle radiator and is provided with an ornamental cap plate 3 having its under face formed with a recess seating over the open upper end of the outer casing 1 and housing in spaced relation two spring reels 4 from which flat steel tapes 5 extend to and are secured to the sides of the inner casing 2 adjacent to its upper open end and normally tend to draw through their springs, the inner casing upwardly within the outer casing.

The inner casing 2 as viewed in Figure 2 has its front and rear walls at their upper edges provided with spaced vertical slots 6. The upper end of the outer casing 1 is attached to and supported from the radiator 7 of the motor vehicle by means of pairs of long bolts 8 backed by washer plates and extending through the fins of the radiator from its rear side, through alining apertures in the front and rear walls of the outer casing and through the slots 6 of the inner casing, the outer ends of the bolts being secured by washer and nut to the outer face of the casing 1. The lower end of the outer casing is mounted upon the front axle of the vehicle for vertical sliding movement relatively thereto by the following means.

A plate 9 secured to the rear face of the front axle 10 is connected at its ends across the upper and lower faces of the front axle by bolts 11 with vertical angle plates 12. Secured to the opposite sides of the outer tubular casing 1 at its lower end are gusset plates 13, best seen in Figures 1, 2 and 4, which are riveted or otherwise secured to the outer casing and extending over the vertical side faces of the angle bars 12. These plates in line with the bars are formed with transversely alined vertical slots 14 therein terminating adjacent to the top and bottom edges of the angle plates and receiving a transversely extending bolt 15 which extends through transversely alined apertures and is rigidly fixed to the angle bars 12 and extends through the slots 14 of the gusset plates, permitting through the slots 14 relative vertical movement of the outer casing and the gusset plates 13 carried thereby relatively to the front axle 10 and allowing for relative movement between the body or radiator supported casing and the front axle through spring flexure.

This relative movement is permitted only when the inner telescoping casing 2 is in the elevated position shown in Figures 1, 2 and 3. When the inner casing with its fifth wheel is forced downwardly to jack up and traverse the front end of the vehicle, the outer casing is automatically locked to the front axle so that this movement is not possible and a rigid support for the fifth wheel is provided. Accordingly, the gusset plates 13 at their bottom edges and inner faces have suitably attached thereto, flanged guides 16 presenting with the gusset plates, tubular sockets extending longitudinally of the vehicle in lines just below the fixed bolt 15. In line with these tubular sockets, the inner face of the outer casing 1 at its lower end, is provided with leaf spring arms 17 having outwardly extending lower ends to which are rigidly secured elongated locking bolts 18 normally, in the elevated position of the inner casing 2 within the outer casing 1, retracted out of the vertical plane of the bolt 15 with the leaf spring 17 positioned at the bottom edge of the inner casing 2. Downward movement of the inner casing will, obviously, flatten the leaf spring 17 and force its locking bolt 18 beneath the fixed bolt 15 rigid with the front axle, thereby locking the upper and lower ends of the outer casing to both the body and axle. Additional connection of the outer casing to the body through the front fender is afforded by a tube 19 extending transversely between and through the gusset plates and having flanged outer ends 20 contacting with and rigidly secured, as by rivets or bolts, to the inside face of the front fenders 21 (Figure 4).

The inner tubular casing 2 is spaced from and guided for vertical rectilinear movement within the outer casing 1 by means of corner angle plates 22 secured to and seating in the corners of and extending vertically of the rectangular outer casing 1, the exterior corners of the inner casing 2 seating in and being guided by the channels formed by these angle plates.

The front face of the outer casing as shown in Figures 2 and 3 is provided at its lower end with an elongated vertical slot 23 therein. The shaft 24 fixedly mounting a relatively broad fifth wheel 25 preferably of pressed steel extends through the slot 23 positioning the fifth wheel exteriorly of both the inner and outer casings 1 and 2 at the front of the vehicle and in its longitudinal median line, the outer of the two casings, necessarily being attached to and rigidly supported from the body in said line to provide for balance when the fifth wheel contacts with the ground and the body is elevated. The shaft 24 extends through and journals in the inner casing 2 adjacent to its lower end and has keyed or otherwise rigidly connected thereto a broad sprocket gear or wheel 26 spaced from the front and rear walls as shown and having a series of transverse V-shaped notches in its periphery to receive the teeth of a wrapping connector in the form of a toothed link chain 27 having V-shaped teeth 28 projecting from its opposite sides or faces.

At its upper end, the inner casing 2 journals a similar broad sprocket gear 29 having similarly spaced and formed V-shaped notches 30 traversing its periphery. The rear face of this gear is provided with a large annular recess 31 therein. A boss 32 formed centrally of the gear within the recess providing a bearing on the shaft 33 upon which the sprocket gear 30 journals for free turning movement. The inner wall of the recess 31 is provided at one point with an inset abutment lug 31ª with which a stop lug on a sliding locking plate cooperates to hold the gear 30 against rotation during a predetermined portion of the downward movement of the inner casing, thereafter releasing said gear automatically as will presently appear.

The front and rear walls of the inner casing 2 are formed with alining elongated vertical slots 34. The outer slot 34 receives and guides on the bearing sleeve 35 threading into an aperture in the front wall of the outer casing alined with the slot 34. The rear slot 34 receives and guides on a second bearing sleeve 36 which extends through from beyond the rear wall of the outer casing 1 partially within the inner casing and has keyed thereon a sprocket gear 37 forming one of two power drives. The rear end of the sleeve 36 has keyed or otherwise rigidly secured thereto a disk 38 having a rear clutch face 39. Extending through the sleeve 36 and journaling at its front end in the sleeve 35 is a power shaft 40 which extends rearwardly of the casing 1 and journals in a bearing disk 41 (Figure 5) keyed to the front end of the crank shaft 42 for sliding movement thereon and having attached to its periphery an outer clutch shifting sleeve 43. The shaft 40 adjacent to its rear end has keyed thereto a clutch disk 44 to rotate with the shaft, this clutch disk having clutch teeth 45 formed upon its front face and rotating in and relatively to the clutch shift sleeve 43. The teeth of this disk 44 face the teeth 39 of the clutch disk 38 secured to the sleeve 36. Between these two disks is mounted a sliding clutch disk 46 having oppositely facing teeth 47 on its front and rear faces designed in reverse positions of the clutch to engage with the teeth of clutch disk 44 or with the teeth of the clutch disk 38. The sliding clutch disk 46 is permanently secured, as through the screws shown in Figure 5, to the outer enclosing clutch sleeve 43 so that movement imparted to this outer sleeve will selectively engage either clutch disk 44 keyed to and rotating shaft 40, or to clutch disk 38 keyed to and rotating sleeve 36. Engagement with this last named clutch disk will effect rotation of the driving sprocket gear 37. Engagement with the clutch disk 44 keyed to and rotating shaft 40 will effect rotation of a similar sprocket gear 48 keyed to and rotating shaft 40 and positioned within the inner casing 2 in spaced relation to sprocket gear 37 and to the front wall of the casing 2.

The chain 27 which as previously described is a link chain having V-shaped teeth projecting from its opposite edges is, as will be seen from Figures 2 and 5, formed of spaced links toothed as described and pivotally cross connected by pivot studs 27ª enclosed between the pairs of links by spacer sleeves 27ᵇ as shown in detail in Figure 9. It will be apparent that traction to the chain is given by the toothed sprocket gears 37 and 48 by the engagement of their teeth with the spacer sleeves, and motion from the chain to the sprocket gears 26 and 29 is secured by the engagement with their notches of the V-shaped teeth 28 of the chain.

Both the gears 37 and 48 revolve in the same direction as the shaft of the motor. The arrangement of the chain or wrapping connector relatively to the notched sprocket gears 26 and 29 and to the power driven sprocket gears 37 and 48 is such that the motion transmitted to the lower notched sprocket gear 26 from the toothed sprocket gear 37, for example, is in a reverse direction to the motion imparted to said gear and shaft from the toothed sprocket gear 48 so that rotation of the fifth wheel 25 in one or the other direction may be secured through the selective rotation of the power sprockets 37 and 48 by means of the clutch mechanism previously described. To secure this reversal, the chain 27 is crossed at the lower end of the inner casing 2 as shown in Figure 3 so that it is engaged by the same side of toothed sprocket gears 37 and 48 and is maintained in engagement with all of the motion transmitting gears by reason of the tension produced by this crossed arrangement. The V-shaped notches in the notched sprocket gears 26 and 29 are made slightly over size to permit engagement of the V-shaped teeth of the chain therewith at the slight incline made necessary by the crossing of the lower end of the chain, which incline, in the full size device, is very slight and is not sufficient to prevent proper intermeshing of the V-shaped teeth and notches.

Motion may be conveniently applied to the clutch shifting sleeve 43 by the operator of the motor vehicle through a vertically movable pedal or floor lever 49 (Fig. 1) conveniently positioned on the floor of the vehicle body adjacent to the driver's seat and pivoted at its lower end below the floor to one end of the bell crank lever 50 mounted in a bracket 51 secured to the under side of the body. A rod 52 is pivotally connected to the other end of said bell crank and extends to the lower arm 53 of a bell crank mounted in a bracket 54 bolted to the rear face of the outer casing 1 between the gusset plates 13. The upper arm 55 of this bell crank is forked and embraces a collar 56 fixed to the outside of the sliding clutch sleeve 43. The forked end of the arm 55 is pivoted to this collar 56 so that movement of the floor lever 49 up or down will slide the clutch sleeve in one or the other direction to rotate sprocket gear 37 or 48 as selected. These connecting positions of the clutch may be determined for example by the fully up or fully down positions of the floor lever, the intermediate position of which will denote a neutral position of the clutch disk 46 and may be normally retained through any suitable releasable latching means.

It is necessary in order to lower the inner casing to cause its fifth wheel to contact the ground and jack up the vehicle, that the rotative power applied from the motor shaft to the fifth wheel be translated from rotary to rectilinear motion during the lower and jacking operation, and thereafter be changed to rotary motion for traversing movement of the vehicle.

This result is secured by the following means. Between the out rear wall of the inner casing and the inner rear wall of the outer casing which are spaced through the angle bars 22 forming the corner guides for the inner casing, a gear locking and releasing plate 57 shown in detail in Figures 6 and 7, is mounted for limited vertical sliding movement. To this end it is provided with vertical slots 58 therein adjacent to its upper and lower ends through which extend guide pins 59 from the rear wall of the inner casing. Between these pins this rear wall is provided with a vertical slot 60 therein (Figure 6) alined with the annular recess of the upper notched sprocket gear 29. Through this slot extends a stop lug 61 integral with or fixedly secured to the front face of the sliding plate 57 between its upper and lower ends, its lower face being curved to conform to the curvature of the outer walls of the gear recess 33; its top face curving to conform to the curvature of the boss 32 and its sides tapered to correspond to the taper of the sides of the abutment lug 33 on said gear within this recess. In the lowermost position of this sliding plate shown in Figures 2, 3 and 6, its stop lug 61 lies in the path of rotation of the abutment lug 33 of the gear 29, preventing rotation of said gear after contact of its lug therewith so that the chain 27 cannot turn the gear 29. In this position of the gear 29 and lugs 33 and 61, which is the normal position in the elevated or inoperative position of the inner casing 2, rotation of the gear 29 in either direction is prevented and the chain 27 functions as a rack. With the clutch operated to connect either of the gears 37 or 48 to the motor crank shaft, either gear will act against the chain thus held as a rack and pull the rack downwardly and with it the inner casing 2 and its fifth wheel 25 and the plate 57.

Initial downward movement of the inner casing engages leaf spring 17 and rigidly locks the outer casing to the vehicle axle as before explained.

Downward movement continues after the fifth wheel 25 contacts with the ground, elevating the front end of the vehicle until the lower edge of plate 57 engages sleeve 36 on power shaft 40, lifting the plate and its lug 61 to release the gear 29 for rotation whereupon the rectilinear rack motion is translated, by rotation of the gear 29 into rotary motion and the lower gear 26 is now rotated in the direction preselected by the direction of clutch shift and the front end of the vehicle is swung transversely in the preselected direction.

Traversing movement is arrested at a desired point by moving floor pedal 49 to neutral position, it being understood, of course, that the motor of the vehicle is running at low speed in the meantime. When the clutch is shifted to neutral position, the support afforded the road wheel and inner casing through the support of casing 1 and the power shaft and its motion transmitting gearing is lost and the front end of the vehicle descends by gravity, the inner casing being forced upwardly within the outer casing, the shaft 40 and sleeve 36 idling as the chain passes thereover in its upward movement. As the inner casing reaches the top end of the outer casing, the locking plate 57 which has been elevated as described to release the notched sprocket gear 29 and which is frictionally retained in its upraised position by suitable means such as a slight nub or projection 62 (Figures 3 and 6) formed upon the outer casing engages the under side of the base of the cap plate 3 (Figures 3 and 8) and is forced downwardly to locking position relative to the abutment lug 33 of the notched sprocket gear 39. At the same time, as the bottom of the inner casing moves upwardly over the outset portion of the leaf spring 17, the resiliency of said spring withdraws the locking bolt 18 thereby releasing the support of the outer casing from the front axle of the vehicle and permitting relative movement for spring flexure by the attachment and the front axle of the vehicle. The lubrication of the gearing on the interior of the inner casing may be effected by filling the bottom portion of the inner casing 1, as shown, (Figures 2 and 3) with a suitable lubricant such as heavy oil which will be carried by the chain to the gears and shafting.

The operation of the jacking and traversing mechanism will be clear from the foregoing description and need not be recapitulated. The specific structural features shown, while representing a preferred form of the invention are intended as illustrative and not restrictive and it is contemplated that modifications in and adaptations of structure to different conditions of operation and manufacture may be made in consonance with the spirit of the invention and the scope of the appended claims.

What I claim, therefore, and desire to secure by Letters Patent is:

1. A jacking and traversing mechanism for motor vehicles comprising a single tubular casing mounted at and extending vertically of one end of the vehicle and composed of fixed and relatively movable telescoping tubular sections, a fifth wheel supported from the lower end of the movable section of the casing for bodily vertical movement therewith toward and from the ground and for rotation about an axis extending longitudinally of the vehicle, motion transmitting gearing housed within said casing sections operable bodily to lower said movable casing section and wheel to jack up the connected end of the vehicle and including mechanism predeterminately operable to stop said jacking motion and thereafter automatically to rotate said fifth wheel to swing the elevated end of the vehicle transversely, a shaft driven by the vehicle motor, and means operatively connecting said gearing and motor driven shaft selectively operable to cause rotation of said fifth wheel in reverse directions.

2. A jacking and traversing mechanism for motor vehicles comprising a single tubular closed casing extending vertically at one end of the vehicle and composed of fixed outer and relatively movable inner telescoping tubular sections closed at their upper and lower ends respectively, a fifth wheel supported from the lower end of the movable inner casing for bodily vertical movement therewith toward and from the ground, operatively connected motion transmitting gearing carried by said fixed and movable casing sections and housed therewithin including a driven shaft carried by and extended to the exterior of the fixed casing section, said mechanism being operable through said shaft bodily to lower said movable inner casing section and its fifth wheel to jack up the connected end of the vehicle and including mechanism determinately operable to stop said jacking motion and automatically thereafter to rotate said fifth wheel to swing the elevated end of the vehicle transversely, a shaft driven by the vehicle motor, and a double acting clutch operatively connecting said gearing and motor shafts and selectively operable to cause rotation of said road wheel in reverse directions.

3. A jacking and traversing mechanism for the end of motor vehicles comprising a single vertically extending closed tubular casing composed of outer and inner telescoping tubular sections, means supporting the outer casing section from the end of the vehicle, a fifth wheel mounted on the inner casing section at its lower end for movement therewith and for independent rotation about an axis extending longitudinally of the vehicle, means normally tending to telescope said inner section upwardly within the outer section and elevate the fifth wheel above the ground, motion transmitting mechanism housed within said casing sections including a pair of operating shafts mounted in the outer casing section and connections therefrom to the inner casing section operable through said shaft to lower the inner casing section and wheel to jack up the vehicle end and thereafter operable automatically to rotate said wheel in reverse directions to traverse the vehicle end, a shaft driven by the vehicle motor, and clutching means selectively connecting said motor driven and one of said operating shafts.

4. A jacking and traversing mechanism for the front end of motor vehicles comprising telescoping outer and inner tubular casings mounted centrally and extending vertically of the front end of the vehicle forwardly of the front axle thereof with means supporting the outer casing from the vehicle body, a fifth wheel mounted on the lower end of said inner casing for bodily vertical movement therewith toward and from the ground and for rotation about an axis extending longitudinally of the vehicle, mechanism including an operating shaft mounted in said casing having independently operable gears therein and connections therefrom to the inner casing and fifth wheel operable bodily to lower said wheel to jack up the front end of the vehicle and thereafter to rotate said wheel in opposite directions to swing the front end of the vehicle transversely, and means connecting the gears on said operating shaft with the crank shaft of the vehicle motor including a double-acting clutch and shifting means therefor selectively operable for reverse directions of rotation of the fifth wheel.

5. A jacking and traversing mechanism for the front end of a motor vehicle comprising inner and outer telescoping casing mounted centrally and extending vertically of said end of the vehicle, means supporting the outer casing from the front end of the vehicle, a fifth wheel mounted in the lower end of the inner casing for rotation about an axis extending longitudinally of the vehicle and for bodily vertical movement with said inner casing toward and from the ground, a transverse operating shaft mounted in said outer casing and extending through alined vertical slots in said inner casing independently rotatable sprocket gears mounted on said shaft, an alined sprocket gear on said fifth wheel, a third alined sprocket gear journaled at the upper end of said inner casing, a sprocket chain encircling said upper and wheel sprocket gears and crossed to engage said shaft mounted gears on similar sides, means normally effective to elevate said inner casing and fifth wheel, means operative in the elevated position of wheel and inner casing to lock said upper gear against rotation thereby to cause said chain to function as a rack to lower the inner casing and wheel to jack up the end of the vehicle through power rotation of said shaft gears, means selectively operable at will to connect either of said shaft gears with the crank shaft of the vehicle motor with means automatically operative to release said locking means upon predetermined lowering movement of said casing and wheel to cause continued rotation of said shaft to rotate said sprocket gears to rotate the wheel and swing the vehicle end transversely in the direction preselected by connection of one certain of said shaft gears.

6. A jacking and traversing mechanism for the front end of motor vehicles comprising inner and outer telescoping casings mounted centrally and extending vertically in front of the vehicle, means connecting and supporting the upper and lower ends of the outer casing to the radiator and front axle, for relative vertical movement of axle and casing in compensation for spring flexure, a fifth wheel mounted in the lower end of the inner casing for rotation about an axis extending longitudinally of the vehicle and for bodily vertical movement with said inner casing toward and from the ground, means normally tending and effective to elevate and telescope said inner case and wheel in the outer casing, a transversely extending operating shaft journaled in said outer casing and extending through alined vertical slots in the inner casing, a sprocket gear keyed to said shaft within the inner casing, a sleeve rotatably mounted on said shaft within the inner casing, a second sprocket gear keyed thereon for rotation therewith, means coupling said shaft and sleeve to the crank shaft of the vehicle motor including a double-acting clutch to engage and drive said operating shaft and sleeve in different positions thereof, a sprocket gear on said fifth wheel alined with said shaft gears, a third alined sprocket gear journaled at the upper end of said inner casing, a locking member on said inner casing adjacent thereto for movement toward and from locking engagement with said gear and having a portion vertically alined with said operating shaft, a chain encircling said upper and wheel sprocket gears and crossed to engage said shaft sprocket gears on the same side thereof, said locking means conditioning the chain to function as a rack in the elevated position of the inner casing and wheel to cause rotation of the operating shaft to lower said inner casing and wheel to jack up the front end of the vehicle until the alined portion of said locking member engages said shaft and is moved thereby to release said upper sprocket gear, said operating shaft and chain being thereafter operative to turn said upper and wheel sprockets to rotate the wheel and swing the front end of the vehicle transversely in the direction preselected by clutch engagement with one certain of said shaft gears.

7. Jacking mechanism for one end of a motor vehicle comprising an inner member positioned centrally and extending vertically of one end of the vehicle and mounting a ground contacting vehicle jacking element and outer casing housing said member, a shaft mounted in said outer casing powered from the motor of the vehicle, means rigidly supporting said outer casing from the vehicle body, a sliding connection between said casing and the vehicle axle permitting relative vertical movement of casing and axle in compensation for flexure of the vehicle springs, means normally effective to elevate said inner member, mechanism connecting said power shaft and inner member operative by rotation of said powered shaft to lower said inner member to contact its jacking element with the ground and to elevate the connected end of the vehicle, and means operated automatically by lowering movement of said inner member to lock the outer casing rigid to the axle against upward movement and automatically operative through elevation of said inner member to release said axle locking means.

8. A jacking and traversing mechanism for the end of a motor vehicle comprising an outer casing mounted centrally and extending vertically of and at one end of the vehicle, means supporting the upper and lower ends of said casing for movement relatively to the vehicle axle in compensation for spring flexure, an inner member mounted within said casing for bodily movement toward and from the ground, a fifth wheel carried by said member for bodily vertical movement therewith toward and from the ground and for rotation about an axis extending longitudinally of the vehicle, and means powered by the motor of the vehicle and operable at will bodily to lower said inner member and wheel to jack up the connected end of the vehicle and thereafter to rotate said wheel to swing the elevated end of the vehicle transversely, and means operated through movement of said inner member and wheel toward the ground automatically to lock said casing to the vehicle axle against relative upward movement, and operated to release said casing through reverse upward movement of said member and wheels.

9. A jacking and traversing mechanism for the front ends of motor vehicles comprising an outer casing positioned centrally and extending vertically of the front of the vehicle, means rigidly supporting the casing from the vehicle body, a sliding connection between the lower end of the casing and the vehicle axle permitting relative vertical movement of axle and casing in compensation for spring flexure, an inner member mounted within said casing for bodily movement toward and from the ground, a fifth wheel mounted at the lower end of said member and rotatable about an axis extending longitudinally of the vehicle, power operated means for bodily lowering said member and wheel to jack up the front end of the vehicle, and latching means operating by lowering movement of said inner member to lock said outer casing to the vehicle axle against upward movement relatively thereto, said latching means automatically releasing said casing from the axle upon subsequent elevation of the inner member and its fifth wheel.

AUGUST W. ALTHOFF.